Figure 1:
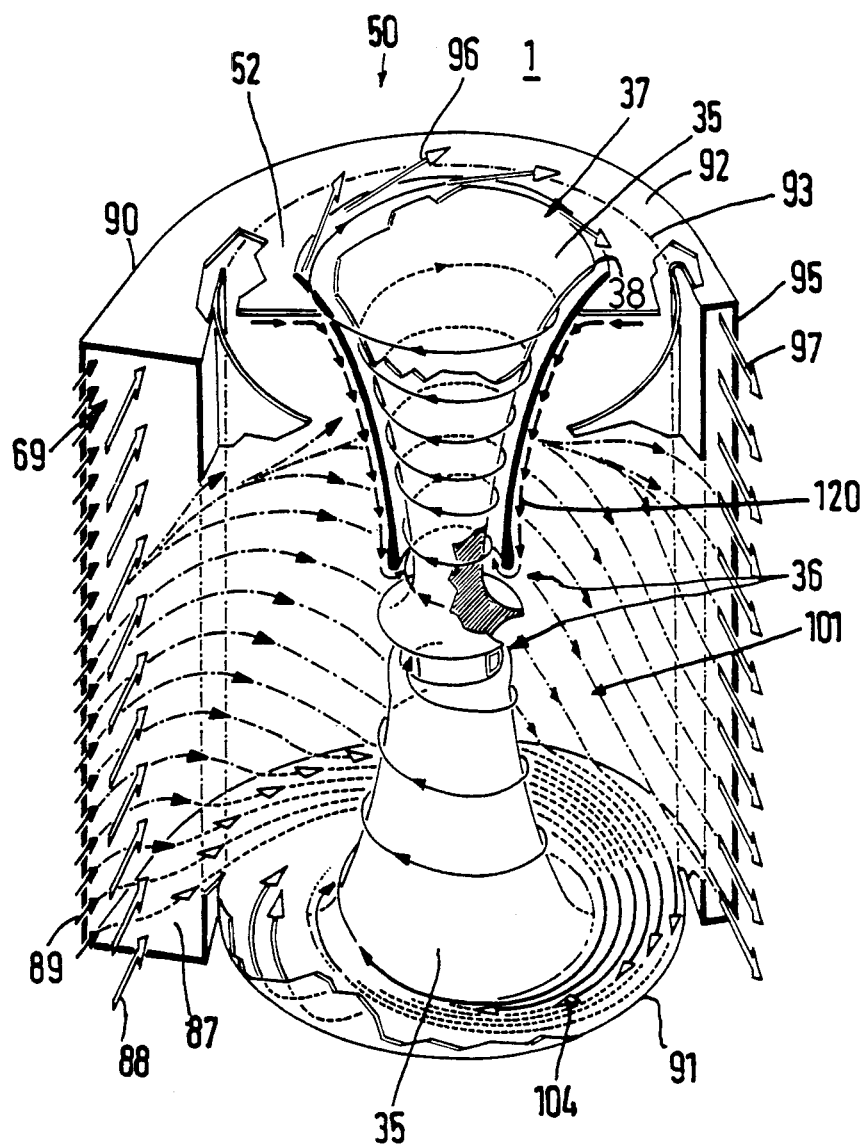

United States Patent [19]

Bielefeldt

[11] Patent Number: 4,848,991
[45] Date of Patent: Jul. 18, 1989

[54] VORTEX CHAMBER SEPARATOR

[76] Inventor: Ernst-August Bielefeldt, Kieferngrund 20, DE-2114 Hollenstedt, Fed. Rep. of Germany

[21] Appl. No.: 258,766

[22] Filed: Oct. 17, 1988

Related U.S. Application Data

[62] Division of Ser. No. 47,002, May 7, 1987, Pat. No. 4,801,310.

[30] Foreign Application Priority Data

May 9, 1986 [DE] Fed. Rep. of Germany ....... 3615747

[51] Int. Cl.$^4$ ............................................ B01D 17/038
[52] U.S. Cl. ........................................ 55/399; 55/457; 55/459.1; 210/512.1
[58] Field of Search ................... 210/512.1; 209/144, 209/211; 55/199, 204, 205, 356, 347–349, 392, 399, 394–398, 434, 447–451, 456, 454, 457, 458, 459, 459.1–459.4, 498

[56] References Cited

U.S. PATENT DOCUMENTS 4,578,840 4/1986 Pausch ................................ 55/356

Primary Examiner—Frank Sever
Attorney, Agent, or Firm—Sixbey, Friedman, Leedom & Ferguson

[57] ABSTRACT

The invention concerns a process for separating and/or precipitating of solid and/or liquid particles (disperse phase) from gaseous and/or liquid media (continuous phase) as well as for separating mixed gases (gas-gas-separation) and/or mixed fluids (fluid-fluid-separation) as well as for screening and/or classifying by means of a vortex chamber separator with suction tube 35. For decrease of flow resistance at generation of moment of momentum the contact zone between main flow and eddy is adjusted to cylinder casing that the tangential initial impulse in laminary bottom flow is increased by means of decrease of laminary bottom flow impulse, secondarily circulating in vortex chamber. For reduction of loss of impulse by means of dissipative drop of pressure in flow of main channel, laminary bottom flow is dynamically balanced with constant or mainly constant average main flow rate. Clean gas flow is passed through suction tubes 35 with increasing cross sections in outlet direction, that flow is affected by only little meridian deviations in zones of extremely high flow speed. The clean gas flow is passed along outside of suction tubes with increasing speed towards inlet sections.

13 Claims, 19 Drawing Sheets

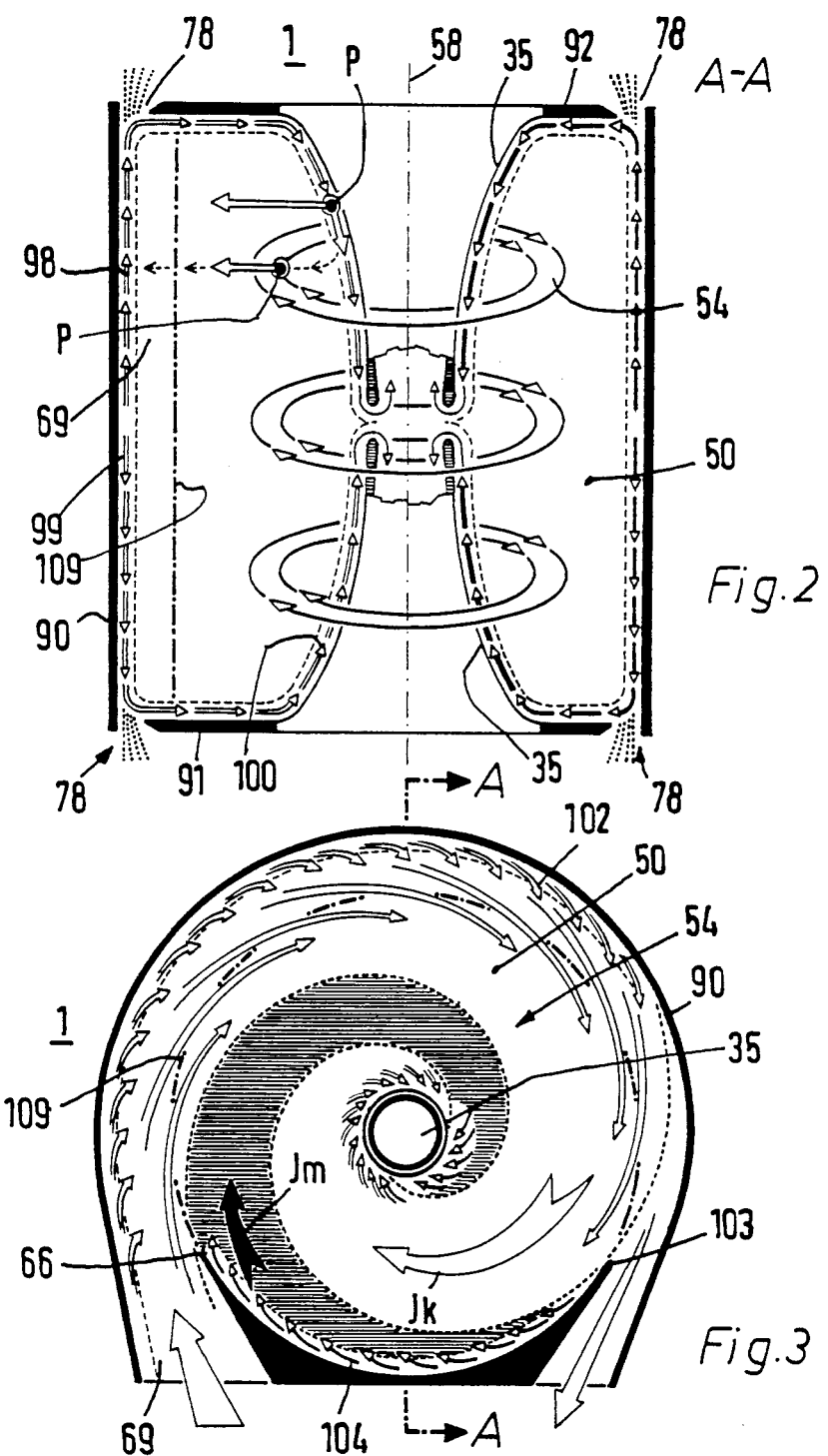

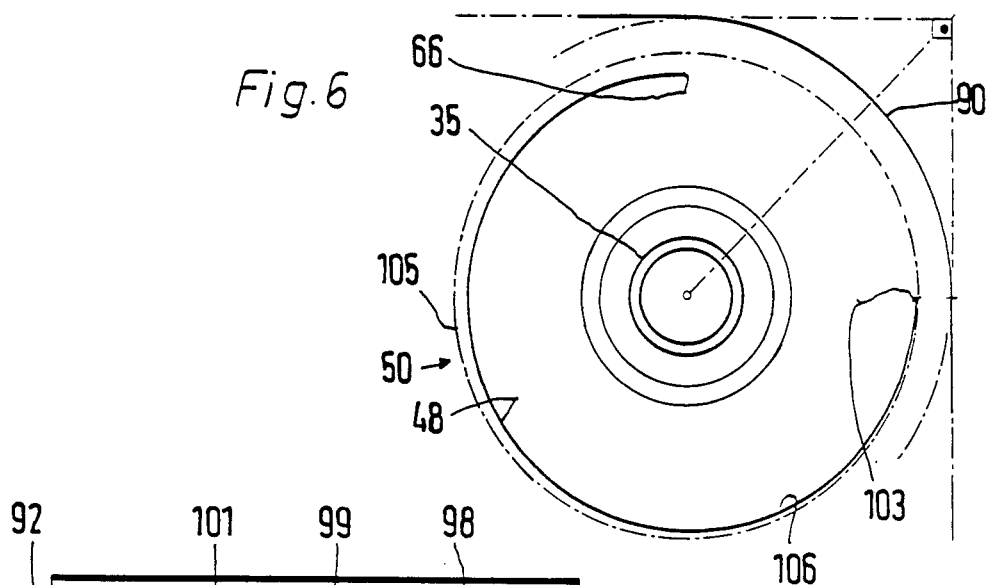
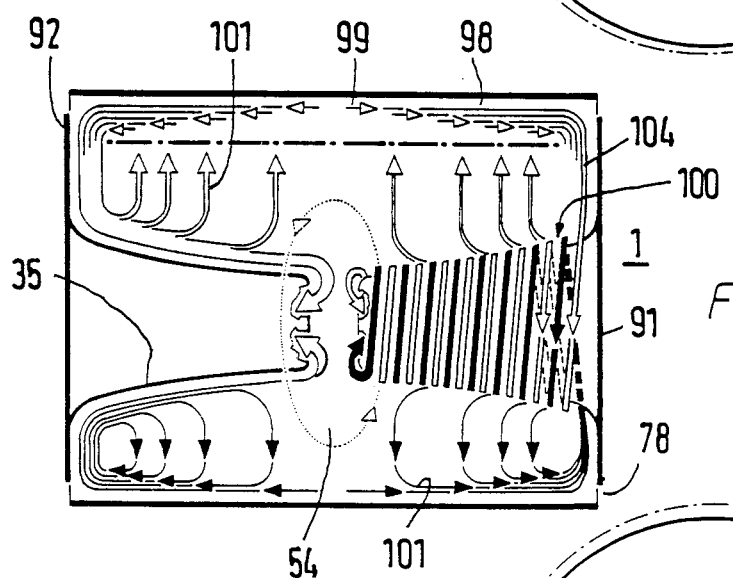
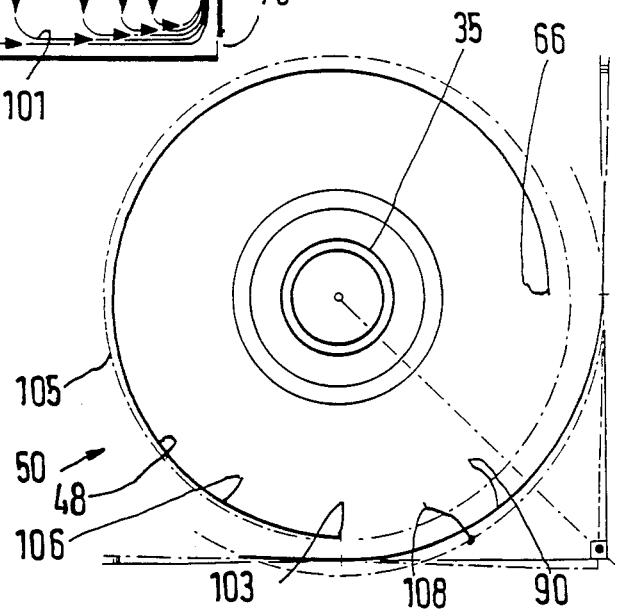

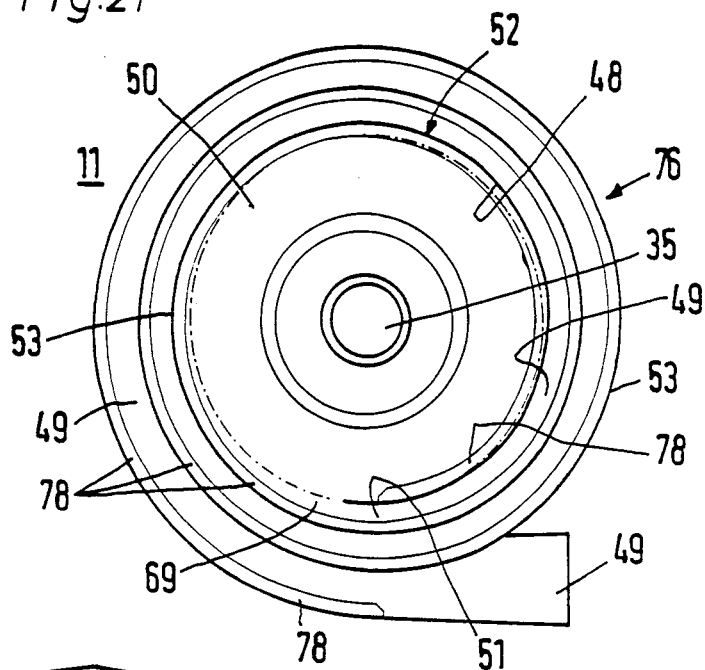
Fig. 21
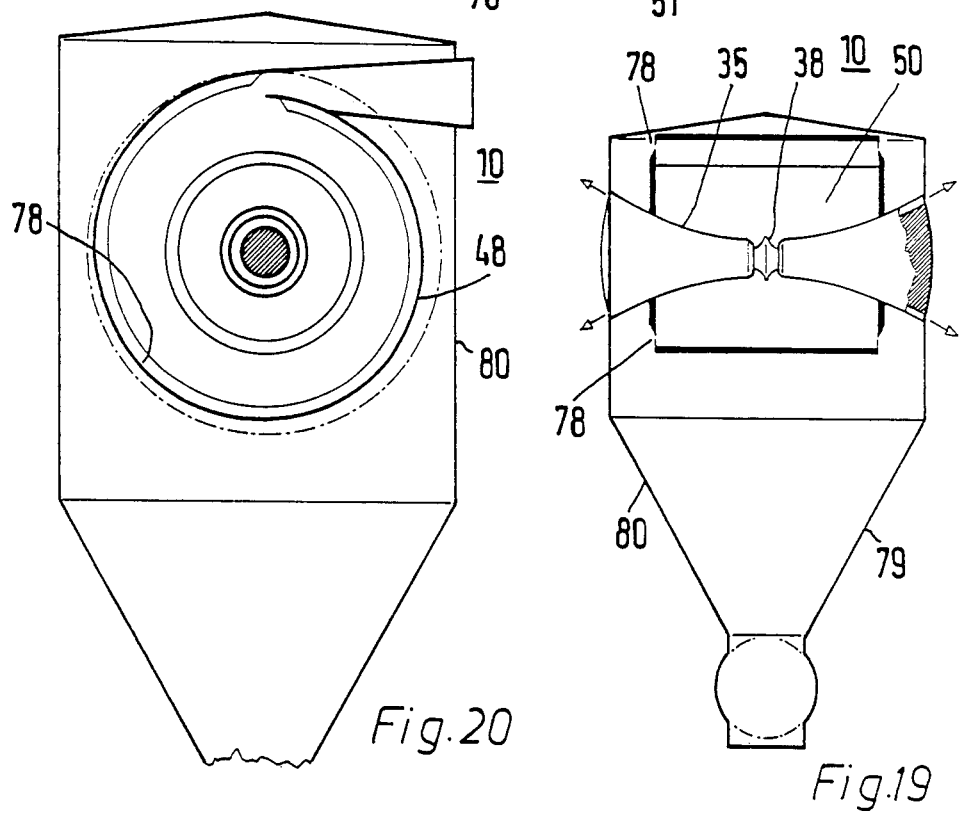
Fig. 20
Fig. 19

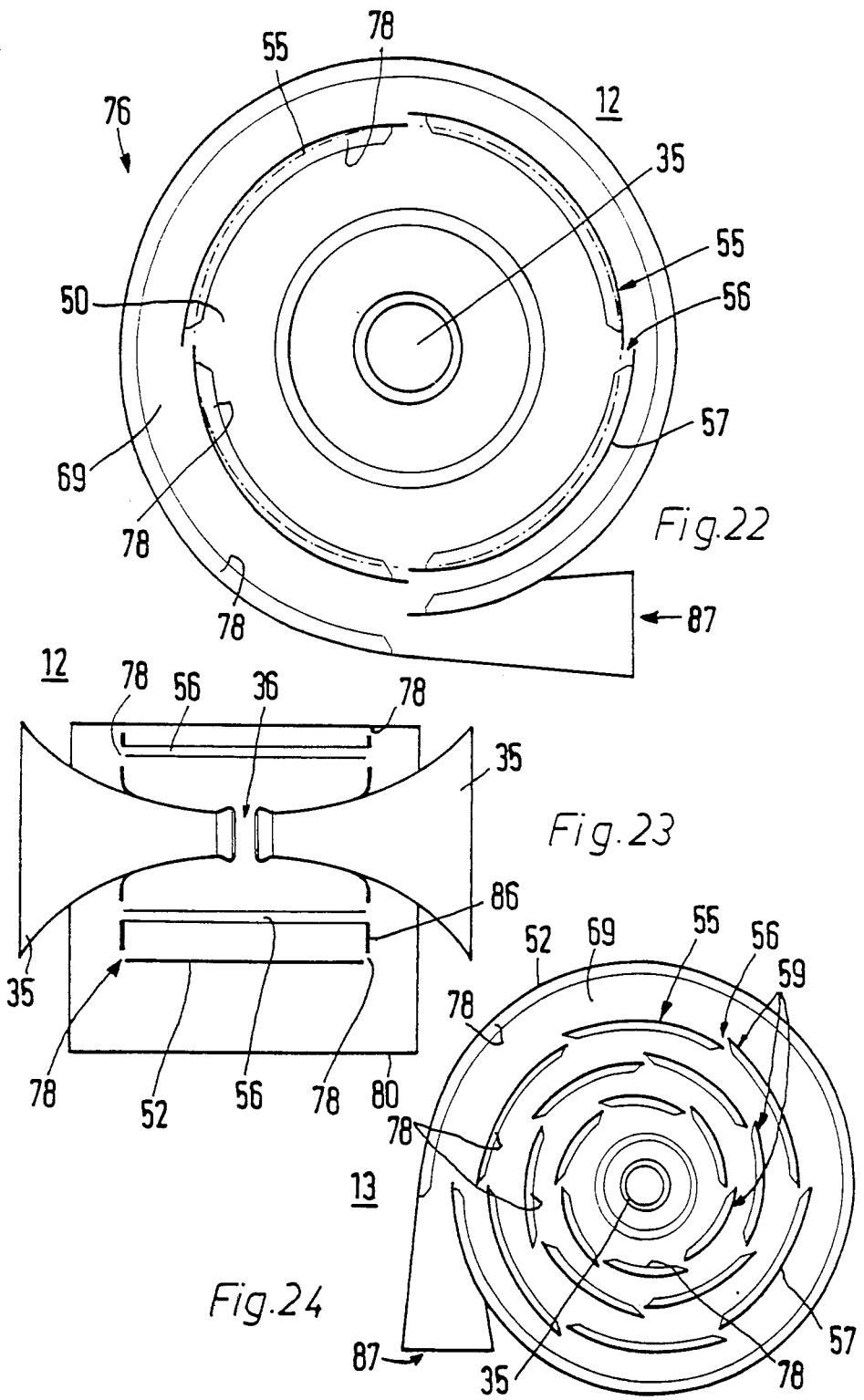

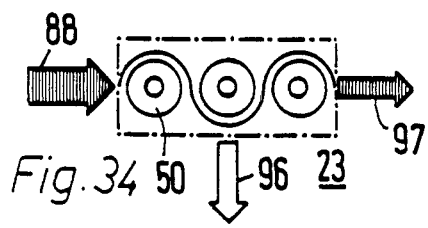
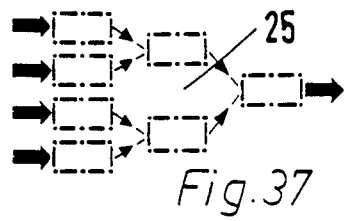
Fig. 34  Fig. 37
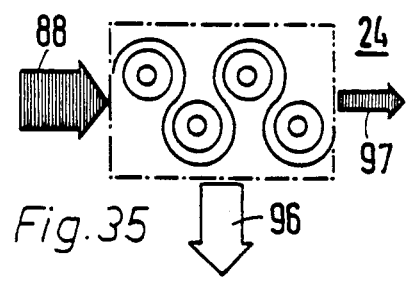
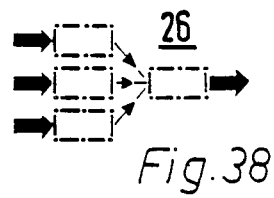
Fig. 35  Fig. 38
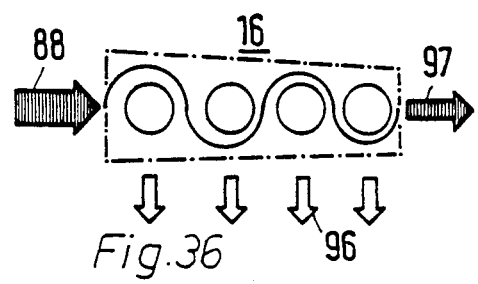
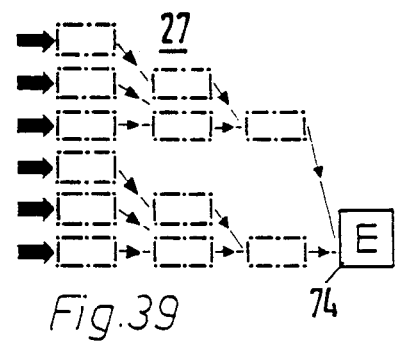
Fig. 36  Fig. 39
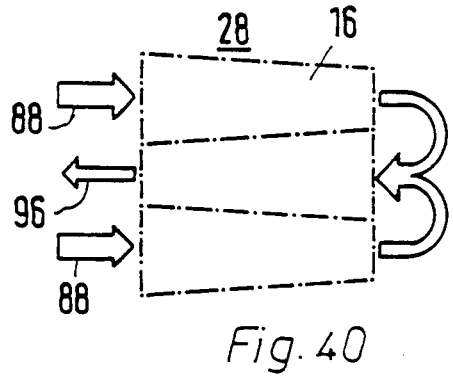
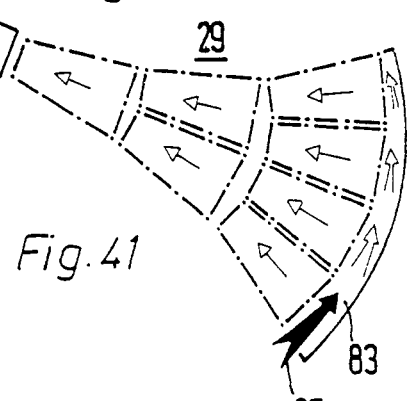
Fig. 40  Fig. 41
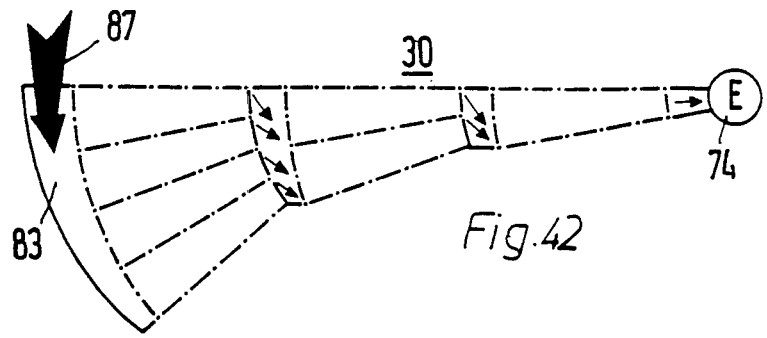
Fig. 42

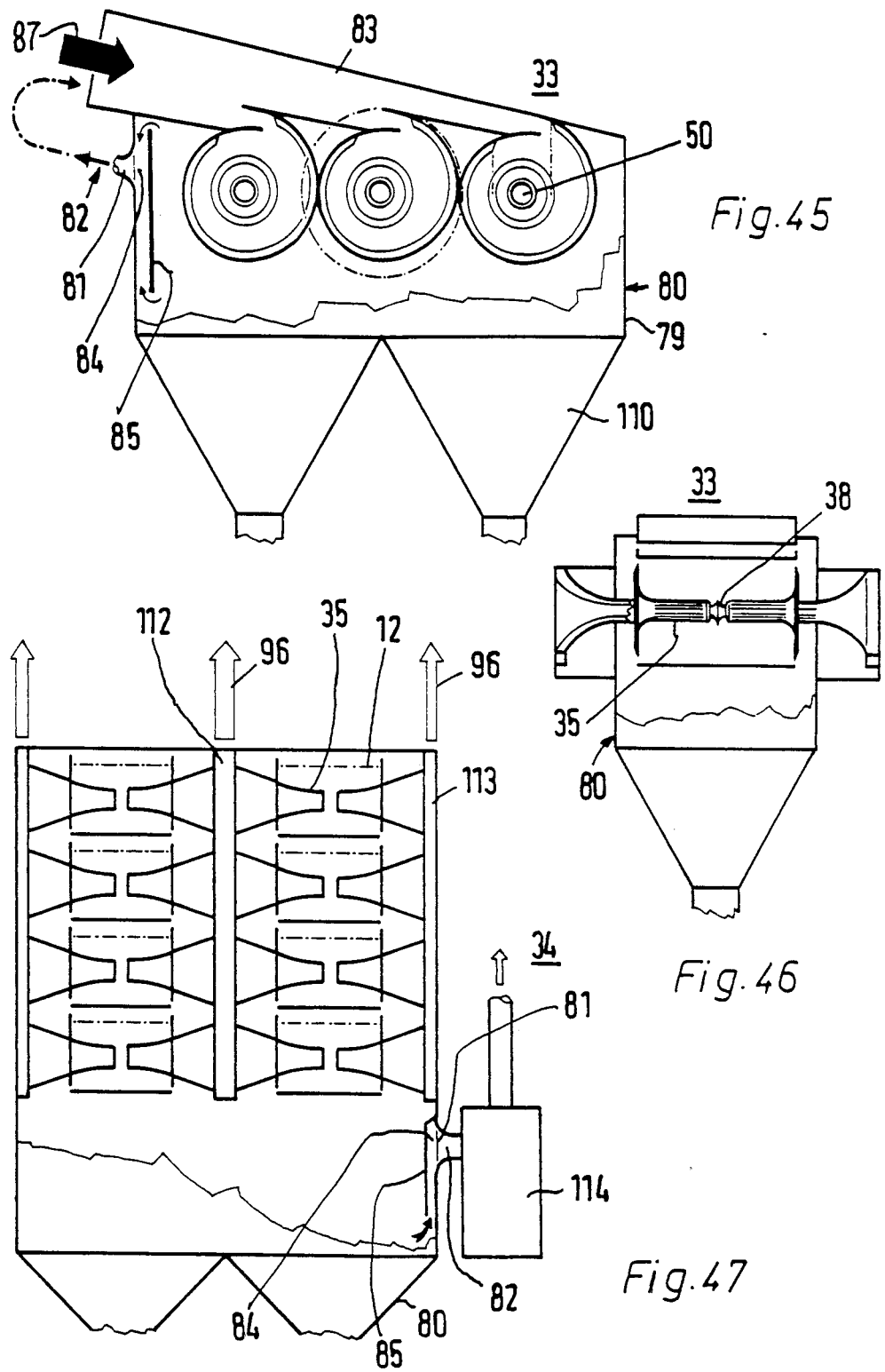

VORTEX CHAMBER SEPARATOR

This application is a division of application Ser. No. 047,002, filed May 7, 1987, now U.S. Pat. No. 4,801,310.

The invention relates to a process for separating and/or precipitating of solid and/or liquid particles (disperse phase) from gaseous and/or liquid media (continuous phase) as well as for separating mixed gases (gas-gas-separation) and/or mixed fluid (fluid-fluid-separation) as well as for screening and/or classifying by means of centrifugal force in a vortex chamber separator from where the specifically lighter fraction is removed by suction through two suction tubes in the central region of the vortex chamber separator, coaxially and mirrorinvertedly arranged to its center planes, and the construction of vortex chamber separators for carrying out the process, with one sharp stall edge and two suction tubes, coaxially arranged in the vortex chamber, extending from the end walls towards each other, and connected to a clean gas outlet and provided with an expanding outlet, whereas a guiding device is provided between the inner ends of inlets.

A vortex separation process as a fluidic separation process with centrifugal forces used for separating or precipitating of a denser disperse phase from a lighter, continuous, flowable carrier phase of aero- and/or hydrodispersion, is known. DE-A1 32 03 498 describes a common vortex chamber separator. Like other known vortex chamber separators it has the disadvantage of relatively bad separating efficiency concerned to energy requirement, because of high flow resistance in the vortex chamber and the multichamber system with a relatively high volume used for improvement of separation. This restricts the operative range of common vortex chamber separator.

Accordingly it is the object of the invention to improve common vortex chamber separators, that separation in vortex chambers improve with decrease of flow resistance, and a better separation is achieved by a volume decrease in multi chamber systems.

Accordingly the the object of the invention is solved in that for decrease of flow resistance at generation of moment of momentum the contact zone between main flow and eddy is adjusted to cylinder casing, that the tangential initial impulse in laminary bottom flow is increased by means of decrease of laminary bottom flow impulse, secondarily circulating in vortex chamber, that a dynamically balanced laminary bottom flow is achieved with constant or mainly constant average speed of main flow for reduction of loss of impulse by means of dissipative drop of pressure, that clean gas flow is passed through suction tubes with increasing cross sections in outlet direction, that flow is affected by only little meridian deviations in zones of extremely high flow speed, and that clean gas flow is passed along the outside of suction tubes with increasing speed towards inlet sections.

Figure 16:
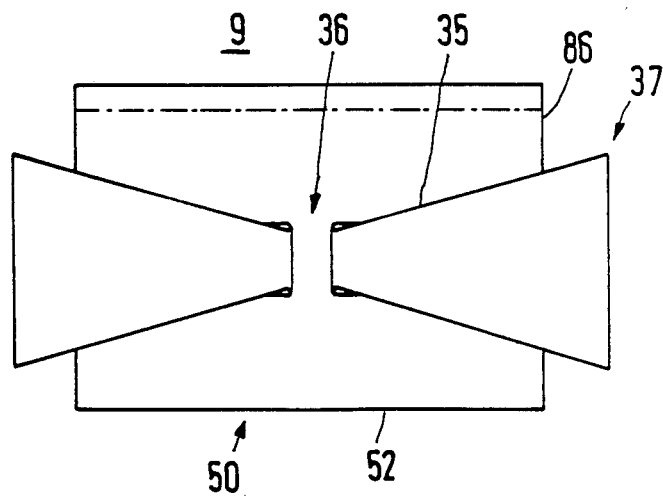
Figure 17:
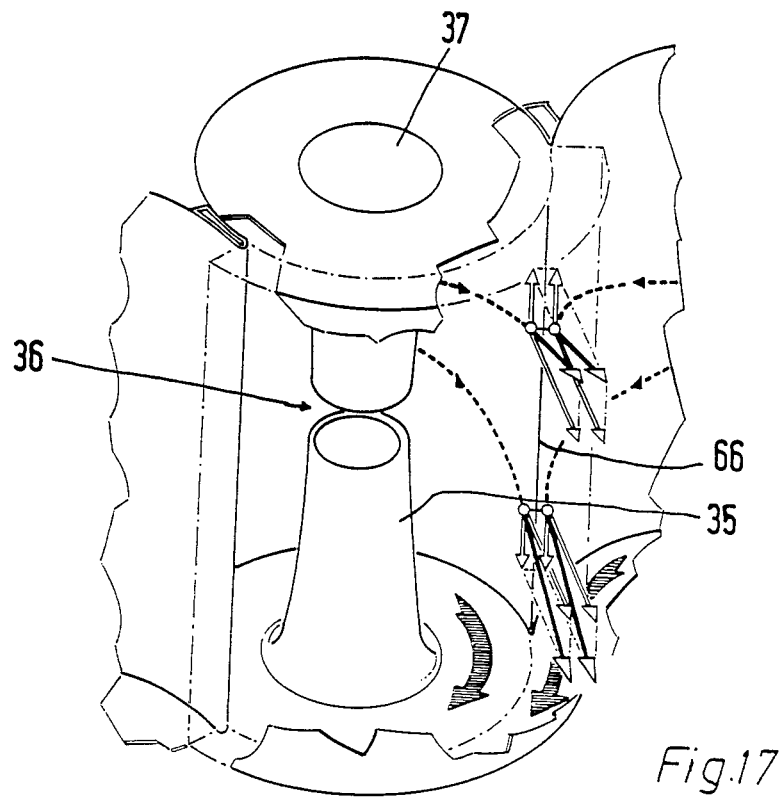
Figure 18:
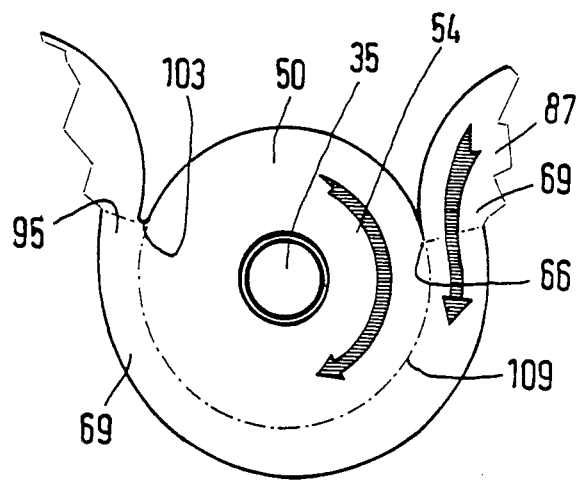

Further features and embodiments of the invention will be described in greater detail by reference to the accompanying drawings and by the subclaims. It shows:

FIG. 1 shows a vortex chamber separator in an exploded, sectional view,

FIG. 2 shows a vortex chamber separator in a sectional side view taken along section line A—A according to FIG. 3, FIG. 3 shows a vortex chamber separator in a diagrammatic sectional view, FIGS. 4–16 are diagrammatic representations of vortex chamber separators in a sectional top and side view, FIGS. 17 and 18 are, respectively, a representation of stall edges in a perspective view and a top view, FIGS. 19–24 are representations of further vortex chamber sepatators in different diagrammatic views, and FIGS. 25–47 show multichamber systems of vortex chamber separators in different views.

FIGS. 1 shows a vortex chamber separator in an exploded view, where the raw gas flow 88 is introduced into the separator casing 52 through raw gas inlet 87. As usual, the raw gas volume is separated in vortex chamber separator 1 into a clean gas flow 96 and a residual raw gas flow 97. The residual raw gas flow 97 leaves the separator casing 52, through residual raw gas outlet 95. Clean gas flow 96 leaves collector casing 52 through two suction tubes 35 in the upper end wall 92 and the lower end wall 91 of the vortex chamber 50. Trumpet shaped suction tubes 35 show an expanding cross section from inlet section 36 towards outlet section 37. Resulting flows in the separator casing 52 are marked by arrow lines. A secondary flow 89 is formed at the bent main flow channel portion 90 of the main flow channel 69. A secondary flow 104 is present on the end walls 91, 92 of the vortex chamber 50. A further secondary flow transversely arranged is marked with character 101. Another secondary flow 102 travels meridionally along the casing of suction tubes 35. An eddy 54 is formed transversely to center line 58 of suction tubes 35, shown in FIG. 2. In the range of bent main flow channel of main channel 69 before portion 90, a laminary casing flow 99 is formed of meridian components. Further, the pre-separating zone is arranged at bent main flow channel portion 90, where separated solid matter is removed through drag-out openings 78, arranged in end walls 91, 92 of vortex chamber 50. At a connecting region between vortex chamber end walls 91, 92 and suction tubes 35 a micro-separating zone is arranged.

In contrast to cylindric suction tubes, trumpet suction tubes 35, as shown in FIG. 1, have several advantages. A smooth flow at meridian flow deviation results in a lower radial loss of moment of momentum and an improvement of separation in vortex chamber 50, compared to vortex chambers with cylindric suction tubes. Construction of suction tubes 35 with progressively increasing wall curvature in axial planes from inlet section towards outlet sections results in a further reduction of local loss of impulse, whereas in regions of highest flow rate, flow is additionally affected only by little meridian flow deviations. Further, suction tubes 35 with variable cross section reduce volumetric region of dissipative field of eddy flow. The casing flow therefore supplies spin energy only to a smaller eddy volume. This reduces dissipative loss of pressure. Hereby a higher spin energy is supplied to casing flow from initial moment of momentum. originated from mainly straight flow, entering rotating flow tangentially peripherally. Hereby an improvement of separation efficiency in vortex chambers 50 is achieved. Volume reduction of eddy flow field results in shorter carrying distances for particles P, precipitated in micro-separating zone 100 by means of eddy 54 in axial planes. As a result these particles P can be removed faster from vortex chamber 50, simplifying the separation process. Due to low displacement forces, inwardly orientated, the radial secondary flow 104 on vortex chamber end walls 91, 92 has also concentrating effects. This is caused by particles P being passed along bent main flow channel portion 90 of main flow channel 69 with local continuum speed, and entering the zone of bottom flow at a higher speed than that of the bottom flow itself. Locally increased drops of moment of momentum in bottom flow with cylindric suction tubes is reduced in case of suction tubes 35 by means of increase of suction tube cross section in the region of vortex chamber end walls 91, 92. For this, radial reduction of plane momemtum zone in the region of vortex chamber end walls 91, 92 and limitation to outer range of radius with less effects to reduction of cross-section is responsible. As a result, momentum affecting concentration is reduced. Areas of vortex chamber end walls 91, 92 form efficient separating zones for secondary flow, where displacement forces for particles P correspond with meridian flow. Reduction of separating bottom areas by means of suction tubes 35 with variable cross section increases separation efficiency of vortex chamber 50. Furthermore, an enlangement of the highly effective micro-separating zone is achieved by means of suction tubes 35 with variable cross section. Separation starts at a plane end of the meridian flow at the beginning of the curved casing profile of suction tubes 35. Cross flow separation is achieved in micro-separating zone 100, starting abruptly and increasing negatively correlated to local cross section of suction tubes. Corresponding to an enlargement of micro-separating zone 100 by means of suction tubes 35 of variable cross section, particles P can be separated more efficiently and faster from the meridian flow, travelling on spiral paths. As a result, a reduction of particle concentration in clean flow medium 96 is achieved. Furthermore, local drops of moment of momentum in the region of flow field are reduce by means of a faster decrease of decrease of local concentration. This allows a higher local spin rate, improving the decrease of concentration. This leads to a construction of suction tubes 35 with variable cross sections, cyclically supporting fluidic and technical improvements in micro-separating zone 100, resulting in better separation and precipitation in vortex chamber 50 with lower loss of pressure compared to cylindric suction tubes. According to the invention suction tubes 35 show a progressively curved casing in a coaxial zone from inlet section 36 towards outlet section 37.

Arrangement of contact zone 93 between main flow in main flow channel 69 and eddy 54 is very important. The position of contact zone 109 afects the spin of the eddy field and therefore separation and precipitation efficiency of vortex chamber 50. It is advantageous to construct vortex chamber 50 in such a way that the mathematical surface area of contact zone 109 is large in relation to 52 casing of vortex chamber 50. Due to greater main flow deviations, a decrease of flow resistance at generation of moment of momentum is achieved. Initial drops of moment of momentum result from impulses I. and I.. I. is the impulse of laminary bottom flow, entering vortex chamber 50 as driving moment of momentum from main flow of high energy. I. is a secondary rotating retarding impulse of laminary bottom flow inside vortex chamber 50. Both impulses penetrate laminary bottom flow in helically narrowing zones with impulse compensation by mixing. Enlargement of I.-zones and reduction of I.-zones is caused by the relatively size of contact zone 109, resulting in higher spins at suction tube 35 (FIG. 3).

To prevent impulse drops of driving flow in main flow channel 69, rotational symmetry of flow on contact zone 109 should be obtained. Therefore, bent main flow channel 90 and also the casing of the main flow channel are logarithmically helically curved (FIG. 3 and 4). Local cross sections of main flow channel 69 constantly diminish in the main flow direction and a constant or approximately constant speed of main flow is obtained in main flow channel 69. This results in a constant or approximately constatn speed at the periphery of eddy 54 in the region of contact zone 109. Furthermore, dynamically balanced or mainly dynamically balanced peripheral and radial velocity distributions are achieved in laminary bottom flow. Instead of a logarithmic helical curvature of casing 90 of main flow channel 69 another helical curvature can be provided. For improvement of separating and precipitating efficiency of eddy 54, peripheral casing wall 48 of vortex chamber 50 is also helically curved. Bow 106 of vortex chamber 50 can provide a helical, e.g. logarithmic helical curvature. Hereby, drops of casing impulses of secondary circulating flow are reduce in the casing 52 provided by means of the peripheral casing wall 48.

FIG. 4 shows helical curvatures of bent main flow channel 90 and bow 106 of vortex chamber 50 compared to a reference circle 108 of bent main flow channel portion 90 and reference circle 105 of vortex chamber 50. It is a special advantage that main flow is affected by flow edge 103 because of helical curvature of cylinder casing 48. As a result, a part of high-energy main flow is passed along flow edge 103 towards eddy 54, achieving a driving flow impulse also at casing 52 of vortex chamber 50 thereof. As diagrammatically shown in FIG. 5, a mostly rotational symmetry of the whole circulating flow in vortex chamber 50 can be achieved by means of spiral curvatures of channel portion 90 of main flow channel 69 as well as of casing wall 48 of vortex chamber 50, coming from the rotation axis of eddy, which corresponds to the center axis 58 of suction tubes 35. Because only a part of secondary flow is removed from suction tubes 35 as clean flow medium 96, a remaining part of secondary flow travels back outwards from the radially arranged suction tube ring zone, supporting secondary circulation. The moment of momentum is increased and an improvement particle separation in micro-separation zone 100 and an improvement of radial particle transport via the eddy field is achieved. Directly precipitating vortex chambers 50 with drag-out openings 78 at vortex chamber end walls 91, 92 and at end walls of main flow channel 69 increase the efficiency of precipitation by means of an increase of secondary flow, increasing again velocity of flow at the edges.

As shown in FIG. 6, vortex chamber 50 can also be provided with a circularly bent main flow channel portion 90 and the bow 106 of vortex chamber helically curved. This results in a vortex chamber 50 with a shorter length of the low of contact in contact zone 109, being advantageous for production as well as for construction of serial connections of vortex chambers 50.

Figure 7:
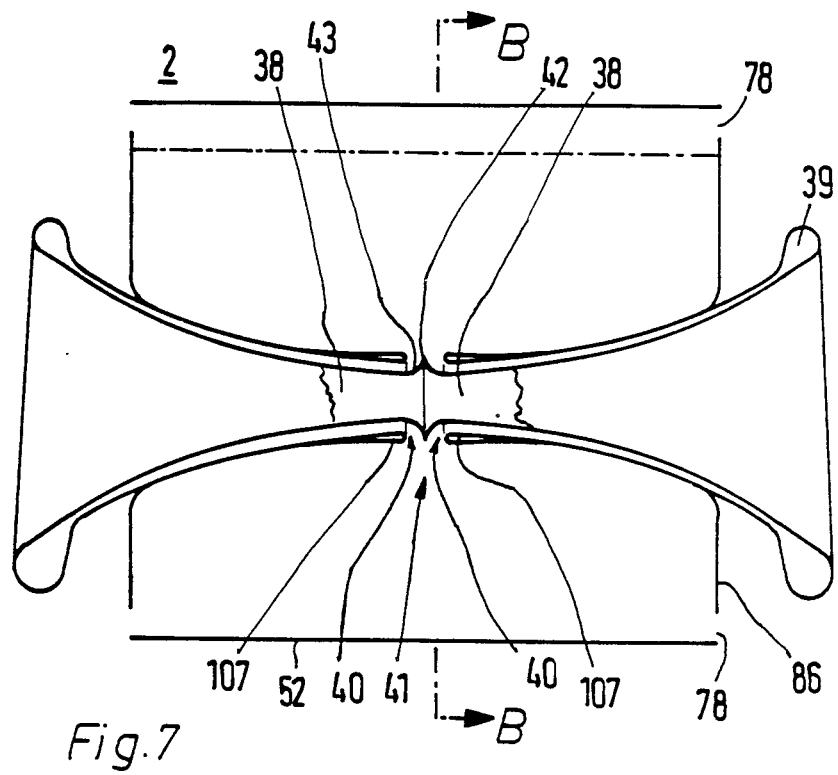
Figure 8:
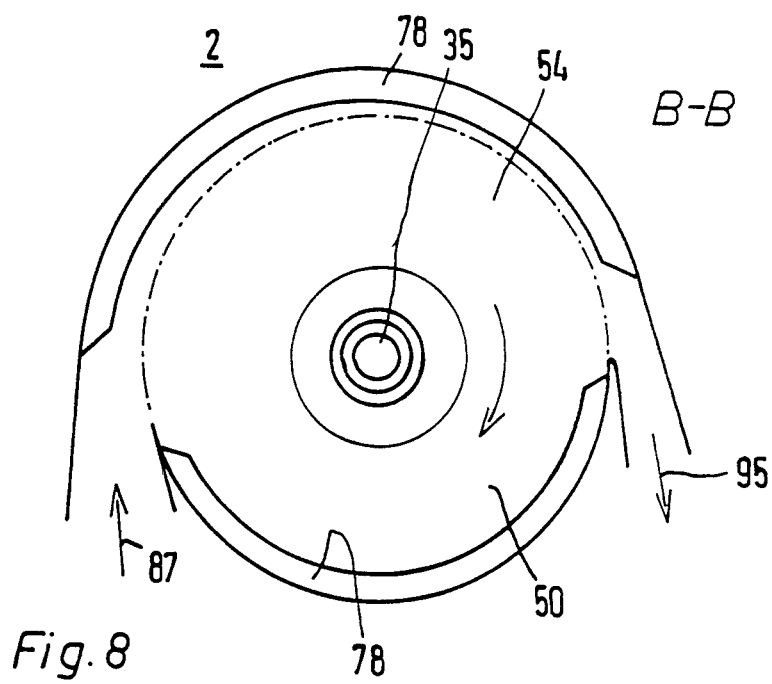

While in micro-separation zone 100 of vortex chamber 50 high spin rates of flow are required at the casing of suction tubes 35, high kinetic flow energy must be reconverted into pressure inside suction tubes 35. Therefore, as already shown for vortex chamber separator 1, suction tubes 35 are constructed with a cross section, increasing from inlet section 36 towards outlet section 37, resulting in a spin diffuser for flow inside suction tubes 35. A trumpet spin diffuser with slight casing curvature, increasing in the flow direction has proved to be advantageous. However other constructions of suction tubes 35 are also possible. It is very advantageous, to convert the inner flow of suction tubes 35 into a circular flow by means of inner cores within suction tubes 35 or an inner core 38 of the diffuser. FIG. 7 and 8 show a vortex chamber separator 2 with a spiral casing 39 serving as a spin diffuser, arranged at outlet section 37 of each suction tube 35. Diffuser inner core 38 merges tangentially into spiral casing 39. Openings 78 are arranged at ends 86 of separator casing 52. Therefore, vortex chamber spearator 2 is a directly precipitating vortex chamber spearator. Diffuser inner cores are constructed as one unit by means of a flow guide 41. Flow guide 41 shows a bead 42, radially aarranged, forming guiding surfaces 43. To reduce local drops of pressure in the region of inlets 40 of suction tubes 35, mouths 107 of suction tubes are lipshaped.

Figure 9:
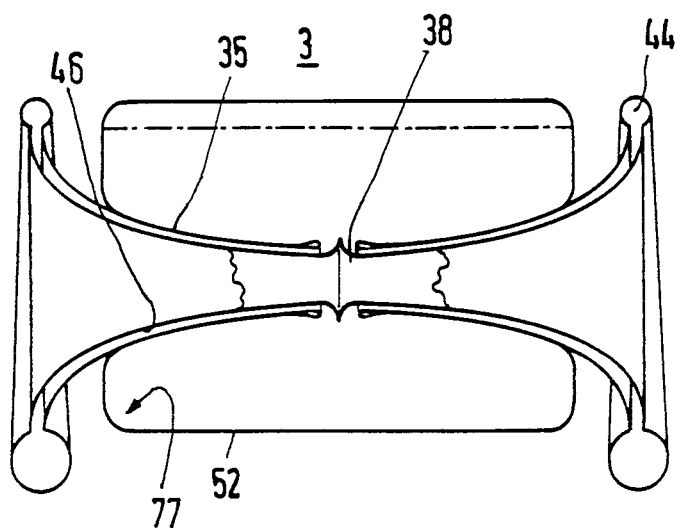
Figure 10:
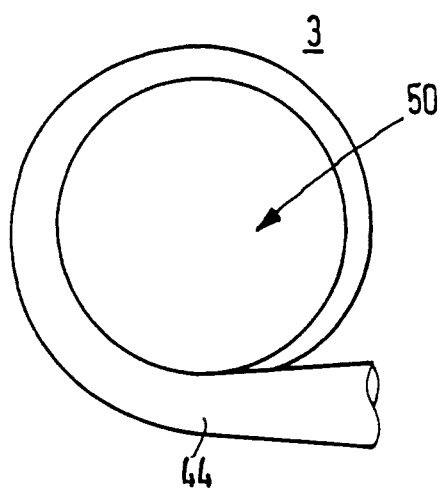

FIG. 9 and 10 show a vortex chamber separator 3 without drag-out openings 78 in vortex chamber 50. To reduce drops of impulse in the region of casing flow, flow edges of vortex chamber 50 are rounded. The spiral casing 44 showing a cross section, increasing in the flow direction, therefore is an optimum spin diffuser. As shown in FIG. 10, one or more tangential flow outlets can be arranged at casing 44. The trumpet-shaped curvature of annular gap spin diffuser 46 ends in an axial section of a plane that is vertically arranged relative to the center axis of suction tube 35, to achieve an optimum radial enlargement of the local annular gap. As a result, a 90° deviation of meridian flow in annular gap spin diffuser 46 is achieved, increasing recovery of pressure in annular gap spin diffuser 46. Spiral casing 44 in connection to annular gap spin diffuser 46 can simply be constructed.

Figure 11:
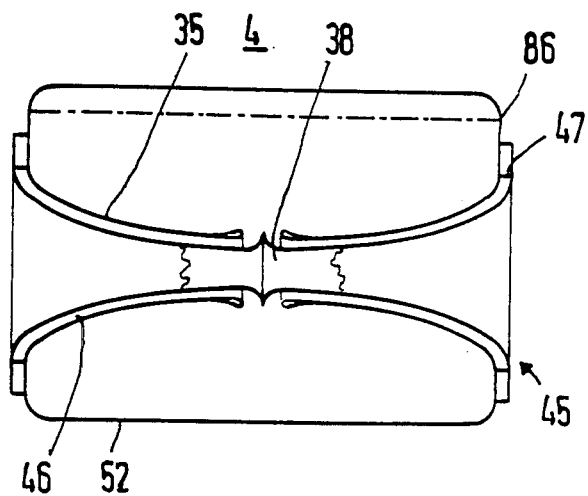

According to FIG. 11, vortex chamber separator 4 shows two suction tubes 35, provided as a trumpet-shaped annular gap spin diffuser 46 by means of diffuser inner core 38. Suction tubes 35 end at ends 86 of separator casing 52, so that vortex chamber separator 4 achieves a smaller size as compared to vortex chamber separator 3. Deviating blades 47 are arranged in outlet region 45 of annular gap spin diffuser 46, are used for despinning of flow inside the suction tubes retarding it circumferentially and meridionally (FIG. 11). Deviating blades 47 can be profiled and/or provided as curved metal blades. Deviating blades 47 allow vortex chamber separator 4 to be reduced in size in comparison to spiral casing 39, 44.

Figure 12:
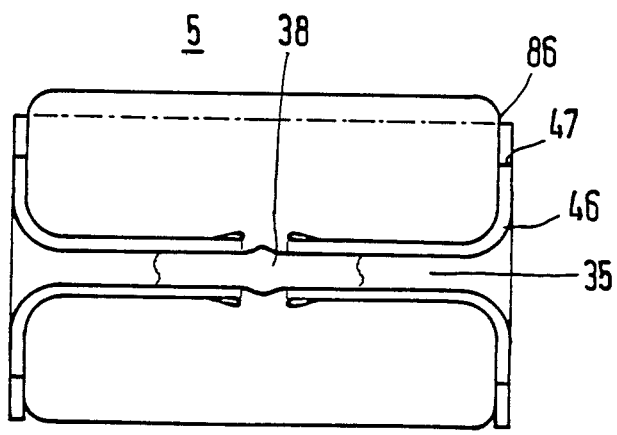
Figure 13:
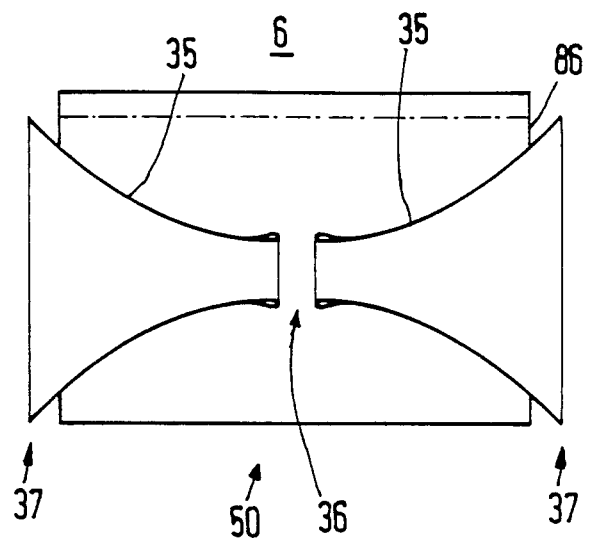
Figure 14:
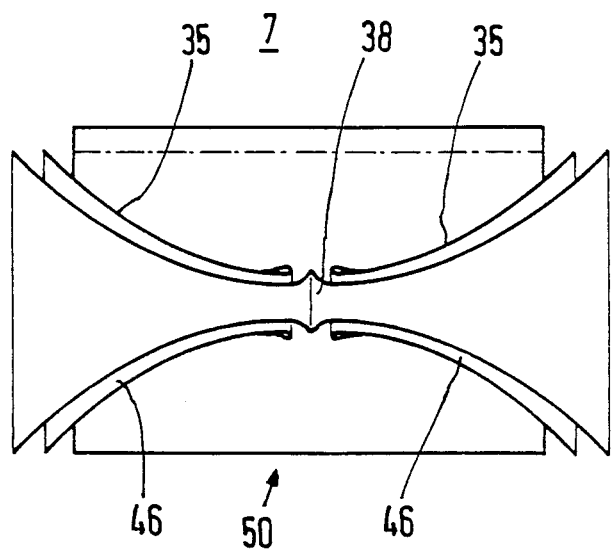

FIG. 12 shows a vortex chamber separator 5 that is simplified compared to vortex chamber separator 4, with a cylindric section of suction tube 35 and an appropriate diffuser inner core 38 that expands in a trumpet-shaped manner at ends 86 of casing. Deviating blades 47 are also arranged at annular gap spin diffuser 46 at ends 86 of the separator casing (FIG. 12). The vortex chamber separator 5 is not optimized with respect to reduction of loss of suction tube pressure, but it has the advantage of a simple construction.

Further vortex chamber separators 6, 7, 8, 9 are diagrammatically shown in FIG. 13 to 16 distinguished according to the construction of their respective suction tubes 35. According to FIG. 13 and 14, suction tubes 35 of vortex chambers spearators 6 and 7 are arranged in simply constructed vortex chambers 50 without drag-out openings and sharp flow edges. Outlet sections 37 of suction tubes 35 exceed casing ends 86 of cortex chamber 50. Suction tubes 35 are provided as simple trumpet-shaped suction tubes 35 and vortex chamber spearator 7 is also provided with a trumpet diffuser inner core resulting in an annular gap spin diffuser 46 in suction tubes 35. Special construction of diffuser inner core 38 prevents detrimental local back flow with secondary or tertiary circulations, appearing in suction tubes without an inner core and interfering with retardation of laminated flow. It is also possible to provide a spiral end casing or guiding end blades outside annular gap spin diffuser 46.

Figure 15:
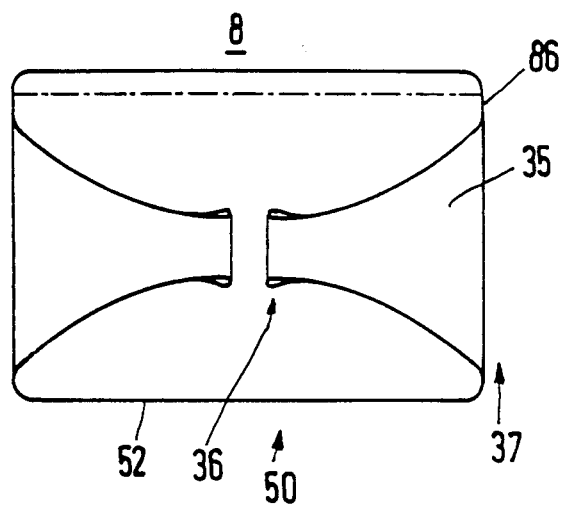

Due to simple construction, vortex chamber separator 8 according to FIG. 15 can be used as element for simple serial or parallel connection in vortex chamber 50. Because outlet sections 37 of trumpet-shaped suction tubes 35 end even with the ends 86 of casing 52, a very compact sepaarator casing 52 is achieved (FIG. 15).

Another simlified embodiment is the vortex chamber separator 9 as shown in FIG. 16. Here, suction tubes 35 are arranged in an angular separator casing 52, constructed as conic spin diffusers. End sections 37 suction tubes 35 exceed casing bottom 86. It is also possible to insert conic spin diffusers into suction tubes 35, not shown here. Guiding end or end casing can be provided at outlet end section 37 of suction tubes 35, while drag-out openings are arranged at vortex chamber 50.

To prevent normally occuring eddies at flow edges 66 of vortex chamber 50, associated with loss of flow, vertical secondary speed at both sides of flow edge 66 should be in the same direction and constant. As shown in FIG. 17 and 18, this is achieved by a concave cylindric side, running from main flow channel 69 towards flow edge 66. In this case, two concavely curved laminary side flows travel from eddy 54 as well as from flow channel towards flow edge 66.

To increase efficiency separation with direct separators, cylinder casing 48 of vortex chamber 50 is helically curved, e.g. logarithmically helically curved (FIG. 20). As a result, the average speed of entering flow as peripheral speed in laminary side flow, is kept constant or increased in the flow direction with radial distances between laminary casing flows, decreasing with increasing distance from rotation axis of eddy. The influence of casing friction retardation is compensated by spiral laminary casing flow with decreasing radius of curvature. Because edge flow speed at drage-out openings 78 is increased by means of spiral construction of cylinder casing 48, precipitating and drag-out efficiency of vortex chamber separator 10 is also increased. As shown in FIG. 19, suction tubes 35 with increasing cross sections can also be arranged in vortex chamber separator 10.

It is also possible to provide a spiral direct separator 76 with a preseparator (FIG. 21). Therefore, a preseparator channel 49 is arranged before main gas flow inlet of main flow channel 69, as high as separator casing 52. Preseparator channel 49 generally shows a rectangular cross section. Drag-out openings 78 can be provided at all for main flow concave edge flow zones of preseparator channel 49, improving preseparation. Rectangular cross sections of flow in preseparator channel 49 can either be kept constant or they continuously decrease in the main flow direction accordin to the helical structure. Hereby, the preseparation flow would be accelerated until entering vortex chamber 50, provided with helical cylinder casing 48, resulting in better separation.

FIGS. 22 and 23 show a vortex chamber separator 12, constructed as a spiral direct separator 76 for raw gas, admitted to vortex chamber 50 through raw gas inlet 87 via several tangetial inlet splits 56. Therefore eddy 54 is separated from main flow channel 69 by means of flow guiding lamellas 57. Individual inlets 56 are arranged between two flow guiding lamellas 57, forming distribution casing 55. Inlet splits 56 are arranged parallelly to the axis of the eddy, showing equal opening sized, and covering vortex chamber 50. Separation and precipitation is improved with numbers of inlet splits 56. Flow guiding lamellas 57 are identically constructed. They are spirally or logarithmically spirally curved and so arranged that laninary casing flows are spirally or logarithmically spirally guided to vortex chamber 50 after they have passed inlet 56. If flow guiding lamellas 57 are peripherally relatively short, they can be provided as circularly curved cylindric sheets, also spirally arranged. This results in a simple construction of vortex chamber separator 12. As shown in FIG. 22, main flow channel 69 can be provided with a peripheral distribution flow. It is possible, to arrange numbers of splits and flow guiding lamellas 57, that distribution flow ends in inlet 56 after one or less circulations. It is further possible to so construct main flow channel 69, that a peripheral flow with broad radial extension is achieved. An acceleration of flow between inlet and multiple outlets is achieved by means of multiple circulation, whereby outlets are also split inlets for direct vortex separation casing. As shown in FIG. 22 and 23, drag-out openings 78 can be provided in even casing bottoms at all edge zones, concavely curved according to local primary flow zones, in the range of eddy as well as in distribution casing, to utilize separation efficiency of secondary laminary flow, extremely curved in these edges. Spiral direct separator 76 according to FIG. 23 is connected to dust collector 80.

A vortex chamber separator 13 is shown in FIG. 24 with several circular guiding blade rings 59, radially arranged according to and surrounding center axis 58 of eddy 54. These show different reference radii, consisting of regularly arranged curved flow guiding lamellas 57. An inlet split 56 is provided between individual flow guiding lamellas 57. Drag-out openings 78 can be arranged in even casing bottom at all concave flow edges, including outer spiral cylindric casing, that in distribution casing 55 an improved dust elimination is achieved. In case of vortex chamber separator 13, flow guiding lamellas 57 are provided as sheet metal blades or guiding sheets, because thickness of profile has only little effect on the flow. Compared to vortex chamber separator 12, flow guiding lamellas 57 are also spirally or logarithmically curved. Adjustment according to individual blade ring 59 to achieve a dynamically balanced spiral primary flow is performed according to local reference radii. Spiral curvatures, prefered for flow guiding lamellas 57 can approximately be achieved by circular arc.

Figure 25:
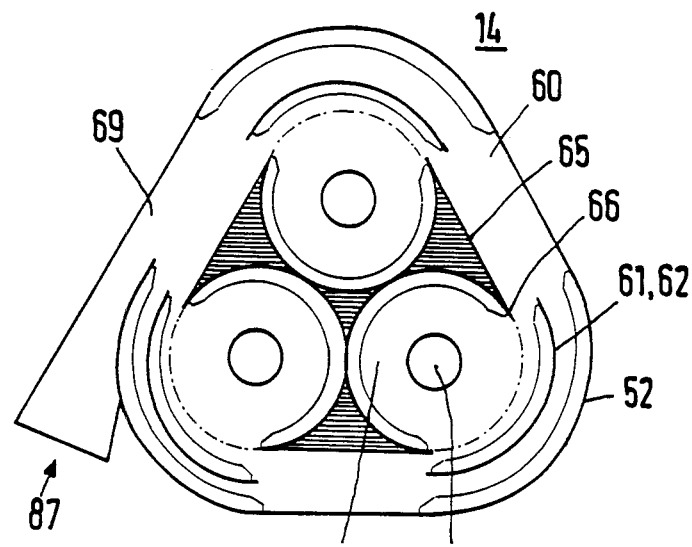
Figure 26:
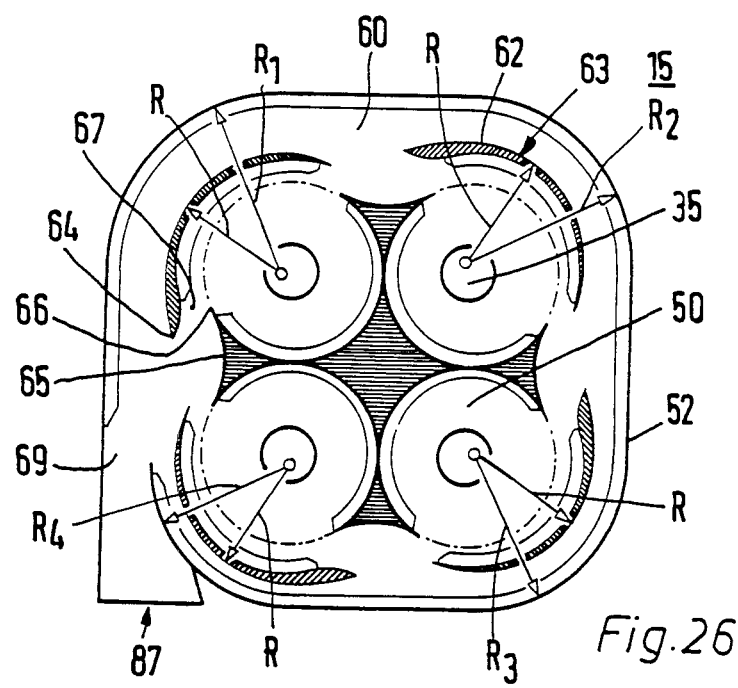

It is also possible, to connect several vortex chambers 50 compactly to one vortex chamber separator. A vortex chamber separator 14 is shown in FIG. 25 with three vortex chambers 50, arranged in one separator casing 52. Main flow channel 69 surrounds vortex chamber 50, whereby flow cross section of main flow channel 69 is sectionally diminished in flow direction after each vortex chamber 50. Curved guiding sheets 61 or guiding profiles 62 of uniform thickness are arranged in the region of flow deviations of main gas flow 60. Guiding sheets 61 or profiles 62 are spirally or logarithmically spirally curved, but however, they can also be circularly arranged and spirally adjusted. Vortex chamber separator 15, shown in FIG. 26 as an compact arrangement of four vortex chambers 50, also shows a circulating main gas flow 60. Guiding profiles 62 are arranged in the region of flow deviations of main gas flow 60, like in vortex chamber separator 14. They are provided with a surface of guiding profile 62 spirally curved and orientated to corresponding eddy 54 and with a convex outer surface 62 of guiding profile, circularly curved. Noses 64 of guiding profiles 62 are soconstructed, that a flow section 67 with a guiding surface 65 arranged towards flow edge 66 and with diminishing cross section in flow direction is provided for each vortex chamber 50. The compact arrangements of vortex chamber separators 14 and 15 can be changed by providing last vortex chamber 50 in flow direction as a direct separator with flow inlet. Because there is no residual raw gas penetration from the direct separator, no circulating distribution flow is achieved. It is possible, to optimize vortex chamber separators 14, 15 according to their operating separation efficiency and their reduction of loss of pressure, adapted to field of application, by means of geometrical construction of vortex chamber 50 and suction tubes 35.

Figure 27:
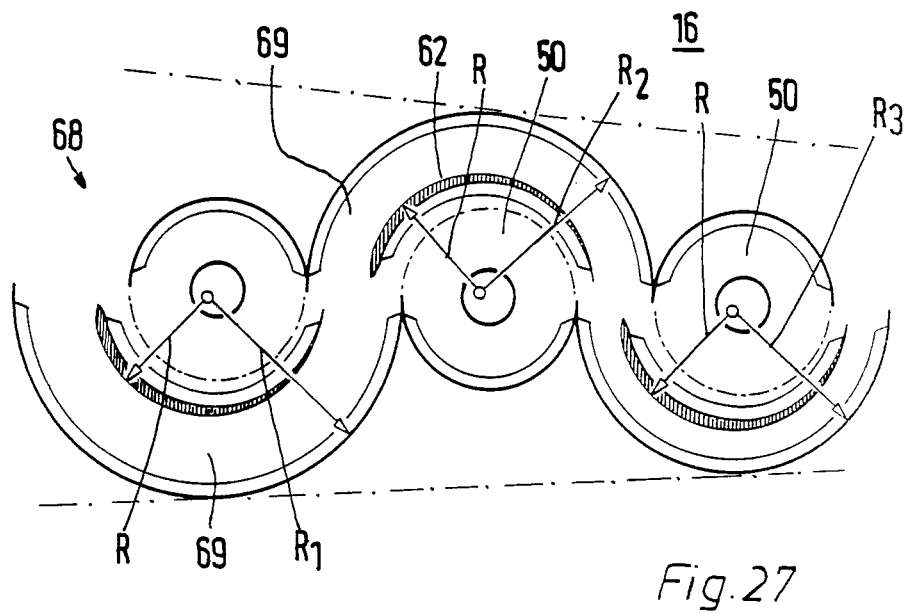

Directly separating vortex chambers 50 can be serially connected, arranged in different geometries. Closed series of directly separating vortex chambers 50 with a direct separator as end separator are advantageous. If the direct end separator is not used, serially connected directly separating vortex chambers 50 are arranged as open directly separating elementary series with residual raw gas removal. Low and constant or mostly constant individual clean gas dust contents and constant or mostly constant residual raw gas dust contents in individual vortex chambers are an advantage. The individual residual raw gas dust contents can be reduced in main flow direction by means of suitable construction. A special advantage of simple construction without flow interference in vortex chambers is achieved with vortex chamber separator 16, provided as serial connection 68 of vortex chambers 50 (FIG. 27). Uniform vortex chambers 50 are arranged with center axis on one plane. Main flow channel 69 is separated from each vortex chamber by means of guiding profile 62 with contact spandrel of approximately 180°. The free flow section of main flow channel 69 is reduced according to continuity after each vortex chamber 50. Guiding profiles 62 of serial connection 68 provided as open elementary serial connection are spirally curved at concave side and circularly curved at convex side. Due to a decreasing cross section of main flow channel 69 in the flow direction, wedge-shaped serially connected vortex chambers have constructional advantages.

Figure 28:
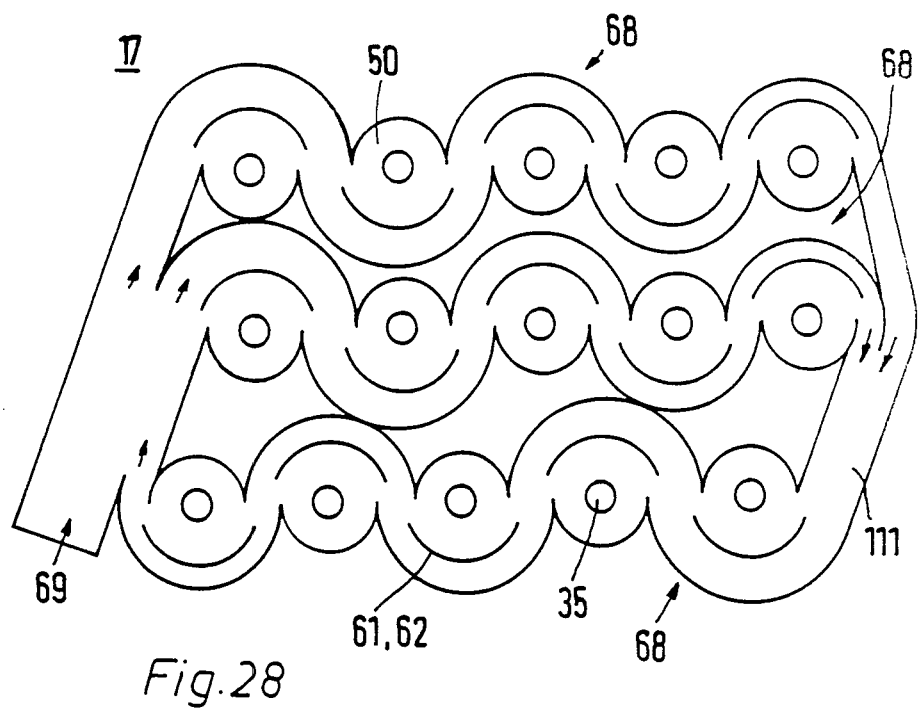

Vortex chamber separator 17 according to FIG. 28 consists of three serial connections 68, whereby two of them are parallelly arranged, while the third is arranged in opposite direction. Main flow channel 69 merges in two serial connections 68, merging together in feedback channel 111. Feadback channel 111 admits the third serial connection, showing an outlet connected to main flow channel 69. Instead of an alternating circuit, vortex chamber separator 17 can be changed that only two or even three parallel serial connections 68 are connected to another series. Elementary series with 50% conversion of raw gas to clean gas are advantageous. Drag-out openings 78 can also be arranged in vortex chamber separator 17.

Figure 29:
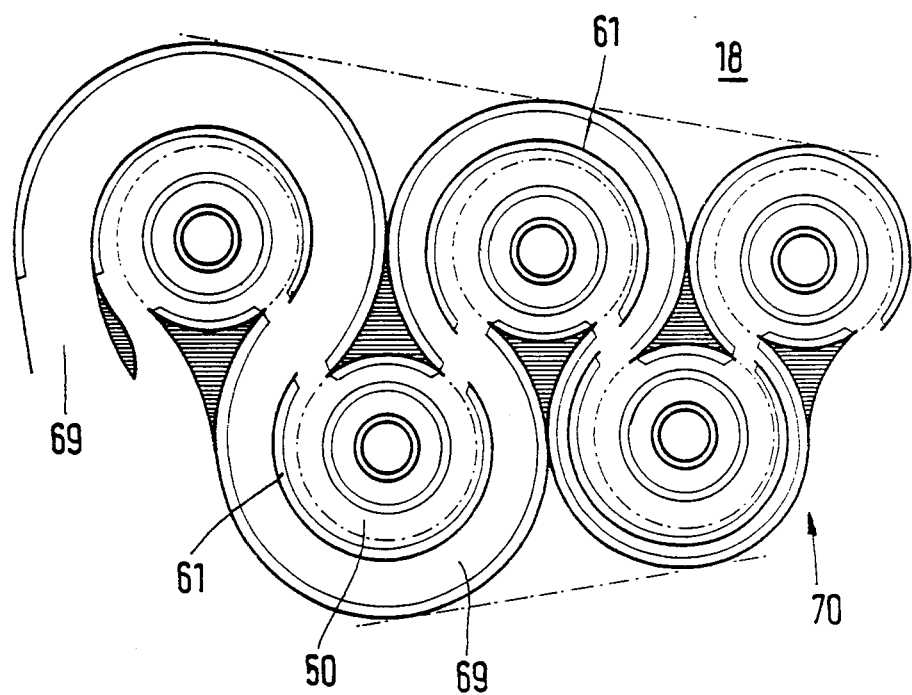
Figure 30:
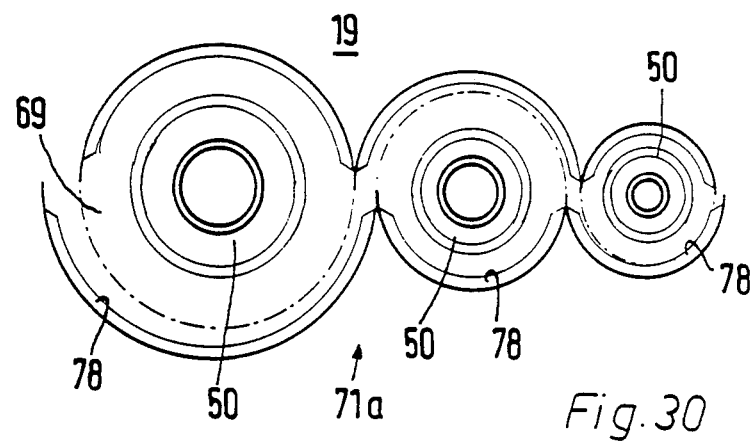

Another elementary series, shown in FIG. 29, can be constructed of serial connection 68 with directly separating vortex chambers 50. For this, maximum contact spandrel is provided. As a result, vortex chambers 50 are arranged at a loop-type main flow channel 69, narrowly packed. Excess volumes are relatively small for this type of construction. Guiding profiles 62 can also be used instead of guiding sheets 61, provided for vortex chambers 50 in serial connection 70. It is further possible, to use serial connection 70 as individual vortex chamber separator 18. A further construction of a vortex chamber separator 19 is shown in FIG. 30, consisting of three vortex chambers 50 with dimishing cross section, arranged as serial connection. Such serial connection 71a of vortex chambers 50 can be used for instruments and plants with circularly parallelly connected elementary series, arranged in sectors.

Figure 31:
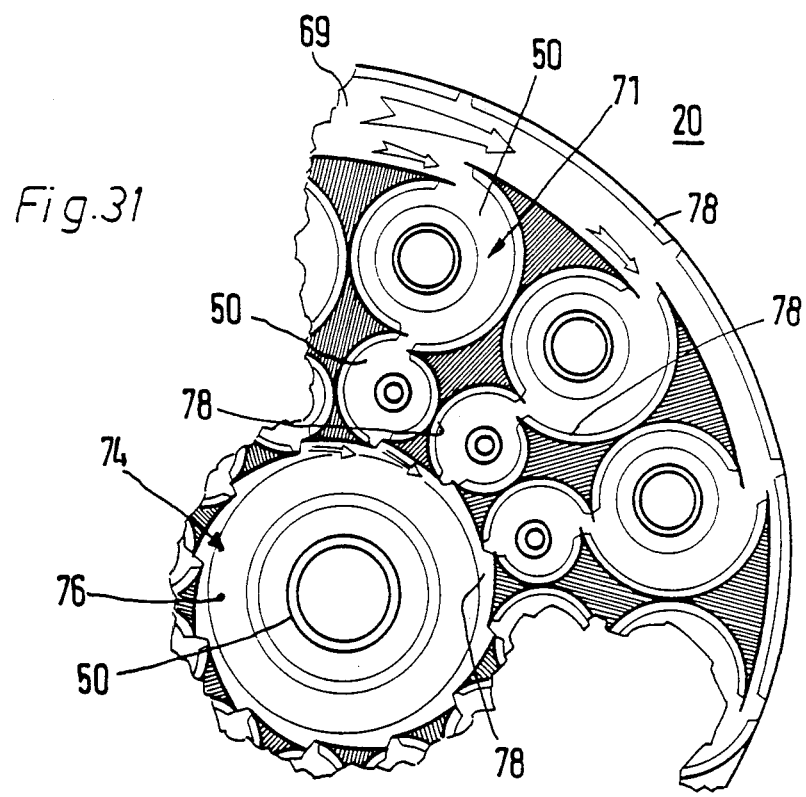

Cylic radial serial connections 71 of two vortex chambers 50 are provided in vortex chamber separator 20 according to FIG. 31, arranged between outer circular main flow channel 69 and central vortex chamber 50, constructed as final separator 74. Main flow channel 69 ends at serial connection 71 or is provided with a circulating distribution flow. Drag-out openings 78 can be arranged at concave flow edge zones of main flow channel 69 as well as in vortex chambers 50. A flow performing and space saving coupling with only one final separator, constructed as direct spiral separator 76, in cylic serial connections of vortex chamber elementary series is very advantageous. According to its main flow channel 69, this separator is provided with multipe initial moment of momentum. Vortex chamber separator 20 is characterized by a very compact construction and can be produced of standardized constructional elements and with only little excess volume.

Figure 32:
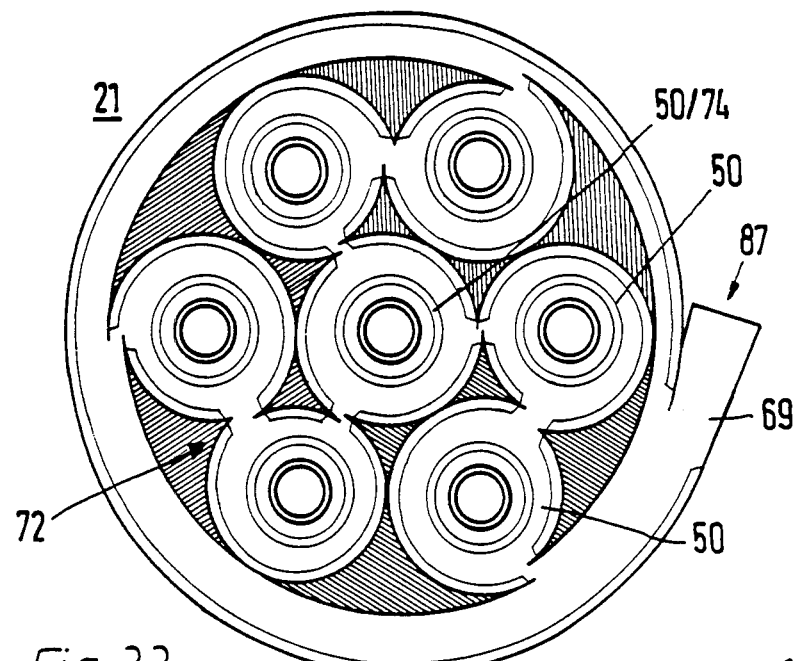

It is also possible, to construct a vortex chamber separator 21 with a number of serial connections 72 of identical vortex chambers 50, cyclically peripherally parallelly connected (FIG. 32). Serial connections 72 are finally connected to vortex chamber 50, constructed as end separator 74. That end separator can also be provided as spiral direct separator 76. Main flow channel 69 circularly surrounds arrangement of serial connections, achieving a circular flow. Series of vortex chambers 72 can consist of directly separating vortex chambers 50.

Figure 33:
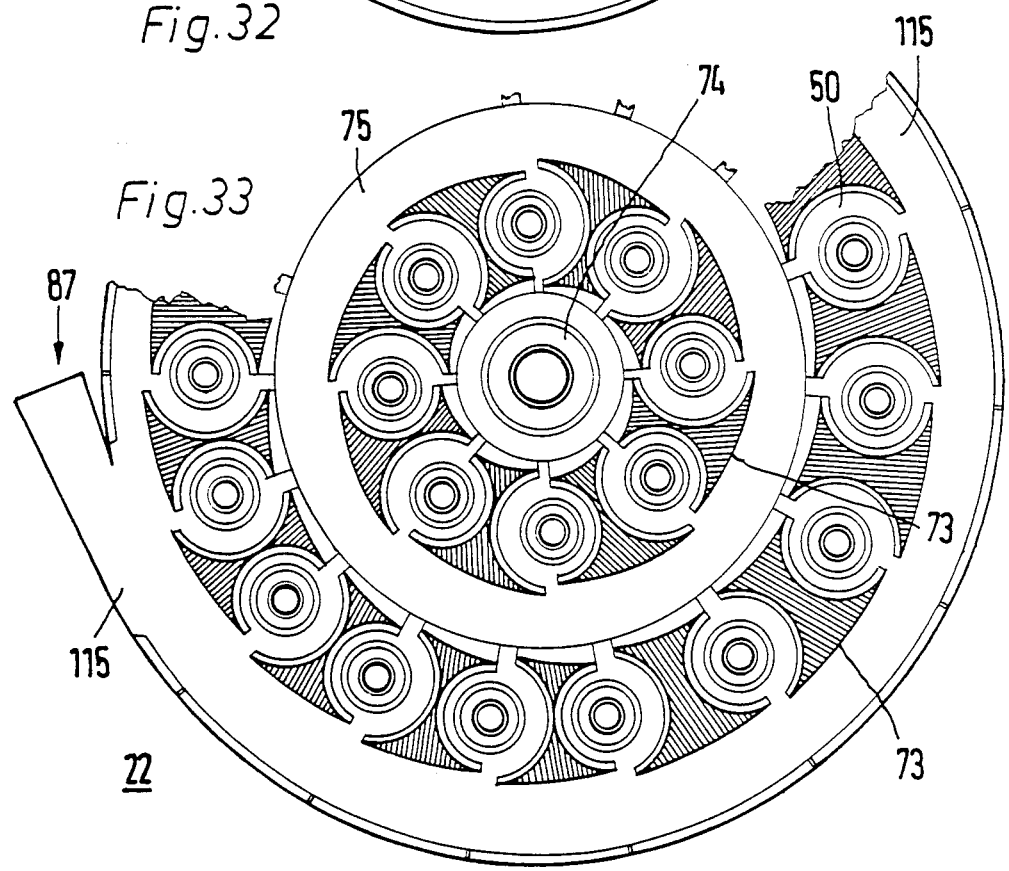

According to FIG. 33, vortex chamber separator 22 consists of two concentrically arranged vortex chamber ring stages 73, surrounded from distribution channel 115. The outer vortex chamber ring stage 73 provides vortex chambers 50, parallelly arranged and conncted to intermediate distribution channel 75. Vortex chambers 50 of inner vortex chamber ring stage 73 are connected to end separator 74 by means of intermediate distribution channel 75. Due to combinations of vortex separators and vortex chambers 50, vortex chamber separator 22 is extremely adaptable to different fields of application. Therefore, it is not necessary to provide vortex chambers 50 to each vortex chamber ring stage 73. Blind elements can also be provided instead of some vortex chambers 50, here not shown in detail. Due to vortex chamber separator 22, it is possible to provide cyclic modular constructions with standard parts.

Different vortex chamber separators 16 and 23 to 30 are shown in FIG. 34 to 42, consisting of diffent connections of vortex chambers 50. Vortex chamber separators 23, 24, 16 are symbolically shown as elementary series of vortex chambers 50, whereby entering raw gas flow 88 and leaving residual raw gas 97 are marked by arrows. FIG. 36 shows the wedge-shaped converging of elementary serial limitations, conditioned by continuum, in vortex chamber separator 16 as an example.

Multiple series of different kind can be achieved by means of elementary series of vortex chambers 50 as shown in FIG. 34, 35 and 36, resulting in vortex chamber separators according to FIG. 37 to 42. The arrangements depend on total suction portions of each elementary series of open plain or directly separating vortex chambers 50. Multiple series have the advantage, that standardized elementary series of vortex chambers 50 can be used for construction of plants.

The multiple series connection, illustrated in FIG. 37, shows a grouping ratio of 2 : 1. Two identically constructed vortex chamber elementary series are connected to another, also identically constructed vortex chamber elementary series. The total suction ratio of vortex chamber elementary series is 0.5 or 50%. The multiple series connection shown, in FIG. 38, has a grouping ratio of 3 : 1 and a total suction ratio of vortex chamber elementary series of $\frac{1}{3}$. FIG. 39 shows another multiple series with a grouping ratio of 3 : 2 in two steps. The total suction ratio of vortex chamber elementary series is $\frac{2}{3}$.

As illustrated in FIG. 39, it is possible, to arrange different rent grouping ratios of vortex chamber elementary series in one plant or one multiple vortex chamber system. Gradually reducing elementary serial connections of vortex chamber separator 27 according to FIG. 39 are finally connected to end separator, constructed as spiral direct separator 76 or other direct separators. Therefore it is also possible, to use a fibrous or electrostatic filter as end separator, provided of small size due to preliminary separation processes. Residual volume flow of last stage in directly separating vortex chamber elementarry series can be returned to total raw gas inlet. The returned volume flow can also be introduced between two stages of vortex chamber elementary series. Circulating connections and partial circulating connections are possible.

In FIG. 40 to 42 stages of vortex chamber elementary series are shown together with vortex chamber separators 28, 29, 30 with wedge-shaped elementary serial casing, used for compact construction as shown in FIG. 36. Raw gas is gradually passed from outer total gas inlet channel 83 over different elementary series of vortex chambers 50 to end separator 74, constructed as spiral separator 76, as described herein before.

Figure 43:
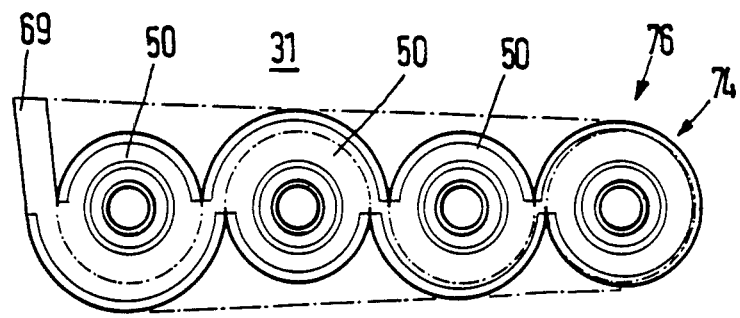

FIG. 43 shows a closed directly separating vortex chamber elementary series as vortex chamber separator 31 with a main flow channel 69, three vortex chambers 50, and an end separator 74, constructed as spiral direct separator 76. Vortex chamber separator 31 can be provided with guiding sheets 61 or guiding profiles 62 in vortex chambers 50.

Figure 44:
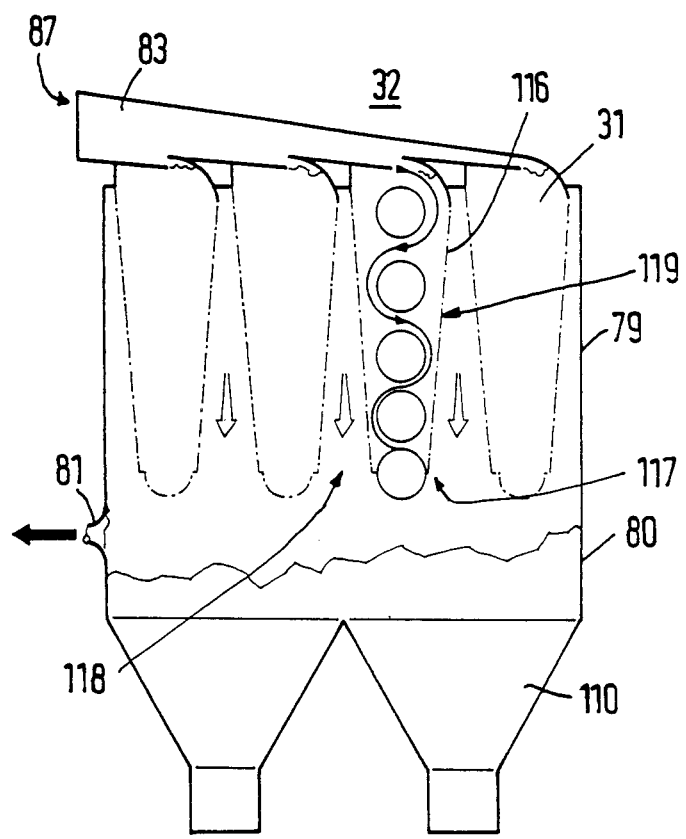

A dust separation plant 32 is illustrated in FIG. 44, consisting of a dust collector 80 and a parallel connection of closed directly separating vortex chamber elementary series 119 according to vortex chamber separator 31. Each vortex chamber elementary series 119 consists of a serial connection 68, 71, 71a of vortex chambers 50, arranged with a wedge-shaped casing 116, diminishing in direction of outlet section according to conditions for continuilty. The individual vortex chamber elementary series are parallelly arranged and connected to total raw gas inlet channel 83, that wedge-shaped spaces 118 between vortex chamber elementary series 119 increase in direction of end sections 117. The free space, hereby achieved, improves efficiency of suction system 81. Dust collector 80 shows a funnel, arranged at the lower section of casing 79. Dust can be removed from casing 79 through these funnels. Suction system 81 is arranged at one side of casing 79. It removes a little volume flow from dust collector 80, to achieve an outlet flow in drag-out openings 78 of directly separating vortex chamber elementary series, not shown in detail herein. This improves dust elemination from vortex chambers 50 and increases efficiency of separation. Wedge-shaped converging of casing elementary series generates wedge-shaped spaces between individual vortex chamber separators 31, unifying the outlet flow, generated by dust suction.

FIG. 45 shows a dust separation plant 33 with three spiral direct separators 76, connected to a total raw gas inlet channel 83. At casing 79 of dust collector 80, a suction system 81 with flow outlet 82 is provided that is connected to the total raw gas inlet channel 83 in the area of raw gas inlet 87. An impact separator 85 is arranged before aspirating hole 84 of suction system 81. The dust content of volume flow, sucked off from dust collector 80 by suction system 81, is reduced by means of the plate-shaped impact separator 85. Separation in impact separator 85 is achieved by means of an extremely curved flow at the edges of the plate.

A direct separation plant according to dust separation plant 32, 33 can be provided for dust separation plant 33, shown in FIG. 46, with spin diffusers of suction tubes 35, arranged outside of separator casing 52, ending in simply constructed outer collector casing for clean gas volume flow 96.

Horizontally orientated, one upon another and side by side parallelly connected directly separataing vortex chamber elementary series are arranged in dust separation plant 34, illustrated in FIG. 47. Spin diffusers of suction tubes 35 in box-type inner collecting channels 112, 113, used for separation of clean gas flow medium 96. A suction system 81 is provided for dust separation plant 34 with an aspirating hole 84, covered by imapct separator 85. Impact separator 85 is provided as shielding, so that suction volume flow must be deviated to outlet of dust collector 80. A small separator 114 is arranged at flow outlet 82 of suction system 81, used for dust precipitation of suction volume flow. Small separator 114 can be provided as spiral direct separator 76.

I claim:

1. In a vortex chamber separator for separating and/or precipitating of solid and/or liquid particles (disperse phase) from gaseous and/or liquid media (continuous phase) as well as for separating mixed gases (gas-gas-separation) and/or mixed fluids (fluid-fluid-separation) as well as for screening and/or classifying by means of centrifugal force comprising at least one vortex chamber with a sharp flow edge and with a pair of coaxially arranged suction tubes disposed within the vortex chamber to which a clean gas outlet is connected, the improvement comprising the suction tubes being constructed of a shape having a cross section that increases from an inlet section to an outlet section thereof.

2. Vortex chamber separator according to claim 1, wherein the suction tubes have a conical shape.

3. Vortex chamber separator according to claim 1, wherein the suction tubes have a trumpet-like shape.

4. Vortex chamber separator according to claim 1, wherein a wall curvature of the suction tubes progressively increases from an inlet section toward an outlet section.

5. Vortex chamber separator according to claim 1, wherein an inner core is arranged within the suction tubes.

6. Vortex chamber separator according to claim 5, wherein, as a means for despinning of circumferentially and meridianally retarded flow inside of the suction tubes, circumferentially arranged deviating blades are provided in an outlet region of an annular gap spin diffuser created by the arranging of the inner core within the suction tubes.

7. Vortex chamber separator according to claim 1, wherein an outlet section of each suction tube is provided with a spiral casing, forming a spin diffuser, that merges tangentially into a diffuser inner core.

8. Vortex chamber separator according to claim 7, wherein the diffuser inner cores of the suction tubes are connected together as a unit by means of a flow guide having a radially oriented bead forming flow guiding surfaces.

9. Vortex chamber separator according to claim 7, wherein said spiral casing is enlarged, in a flow direction, in the manner of a diffuser.

10. Vortex chamber separator according to claim 1, wherein, as a means for producing several vortex chambers, curved guiding elements of uniform thickness are compactly arranged in a region of main gas flow deviations.

11. Vortex chamber separator according claim 10, wherein a main flow channel is separated from the vortex chambers by means of said guiding elements in a manner producing a wavy serial connection of said vortex chambers, and wherein each of said vortex chambers is identically constructed.

12. Vortex chamber separator according to claim 1, wherein the casing of the vortex chamber is provided with drag-out openings for removal of solid matter, said drag-out openings being arranged in flat end walls of the casing.

13. Vortex chamber separator according to claim 1, wherein a plurality of said vortex chambers are arranged in a casing of a dust collector, and said dust collector is provided with a suction system between a flow outlet of the collector and a total raw gas inlet channel of the collector as a means for generating a partial circulating flow.

* * * * *